(12) United States Patent
Petropoulos et al.

(10) Patent No.: US 11,184,483 B1
(45) Date of Patent: *Nov. 23, 2021

(54) FORECASTING AND DYNAMIC ROUTING FOR SERVICE ENVIRONMENTS

(71) Applicant: United Services Automobile Association (USAA), San Antonio, TX (US)

(72) Inventors: Lambros Petropoulos, San Antonio, TX (US); James Walter Wisnowski, San Antonio, TX (US); Andrew Thomas Karl, Aurora, CO (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/198,016

(22) Filed: Mar. 10, 2021

Related U.S. Application Data

(63) Continuation of application No. 16/936,733, filed on Jul. 23, 2020, now Pat. No. 10,979,573, which is a
(Continued)

(51) Int. Cl.
*H04M 3/523* (2006.01)
*G06N 7/00* (2006.01)
(Continued)

(52) U.S. Cl.
CPC ............ *H04M 3/5238* (2013.01); *G06N 7/00* (2013.01); *H04M 3/367* (2013.01);
(Continued)

(58) Field of Classification Search
CPC .. H04M 3/5238; H04M 3/367; H04M 3/5233; H04M 7/006; G06N 7/00; G06F 17/18
(Continued)

(56) References Cited

U.S. PATENT DOCUMENTS 7,372,952 B1 * 5/2008 Wu ..................... H04M 3/5233
370/352
2002/0184069 A1   12/2002 Kosiba et al.
(Continued)

*Primary Examiner* — Ahmad F. Matar
*Assistant Examiner* — Jirapon Intavong
(74) *Attorney, Agent, or Firm* — Fish & Richardson P.C.

(57) ABSTRACT

Techniques are described for forecasting and dynamic routing of incoming routing service requests in a service environment that includes one or more call centers. Implementations apply a doubly stochastic modeling technique to modeling call volumes, call wait times, calling handling times, and/or other parameters in a service environment that includes one or more call centers that include multiple skill codes for the service representatives. By simultaneously modeling on different time scales, such as modeling both inter-day and intra-day correlations, implementations are able to provide an analysis that exploits more of the structure in the data compared to traditional techniques. Implementations can also integrate in other types of time series for other effects that may impact the call volume or other parameters in a service environment, such as exogenous and/or anomalous variables that are independent of other inter-day and/or intra-day trends exhibited in the data.

20 Claims, 11 Drawing Sheets

Related U.S. Application Data continuation of application No. 16/392,037, filed on Apr. 23, 2019, now Pat. No. 10,778,846.

(60) Provisional application No. 62/661,216, filed on Apr. 23, 2018.

(51) Int. Cl.
*G06F 17/18* (2006.01)
*H04M 3/36* (2006.01)
*H04M 7/00* (2006.01)

(52) U.S. Cl.
CPC ........... *H04M 3/5233* (2013.01); *G06F 17/18* (2013.01); *H04M 7/006* (2013.01)

(58) Field of Classification Search
USPC .................................................. 379/265.02
See application file for complete search history.

(56) References Cited

U.S. PATENT DOCUMENTS

| | | | |
|---|---|---|---|
| 2007/0206768 A1* | 9/2007 | Bourne | G06Q 10/063112 379/265.01 |
| 2012/0087486 A1 | 4/2012 | Guerrero et al. | |
| 2019/0312975 A1 | 10/2019 | Kelly et al. | |

\* cited by examiner

FORECASTING AND DYNAMIC ROUTING FOR SERVICE ENVIRONMENTS

CROSS-REFERENCE TO RELATED APPLICATIONS

This application is a continuation application of and claims priority under 35 U.S.C. § 120 to U.S. application Ser. No. 16/936,733, filed Jul. 23, 2020, which is a continuation application of and claims priority to U.S. application Ser. No. 16/392,037, filed on Apr. 23, 2019, now U.S. Pat. No. 10,778,846, which in turn claims the benefit of, U.S. Provisional Patent Application Ser. No. 62/661,216, titled "Forecasting and Dynamic Routing for Service Environments," which was filed on Apr. 23, 2018, the entire contents of each of which are incorporated herein by reference.

BACKGROUND

An organization may use any number of computing systems, communications networks, data storage devices, or other types of systems to provide services to individuals. An organization may also employ service representatives that use the various systems to assist individuals in service sessions that are conducted over the telephone, in a video conference, through text chat sessions, or over other communication channels. An organization may seek to optimize the manner in which incoming service requests are routed to service representatives to ensure optimal usage of computing resources and also to provide an appropriate level of responsiveness to the individuals.

SUMMARY

Implementations of the present disclosure are generally directed to forecasting and routing incoming requests to service representatives (SRs), or groups of SRs, within a service environment. More specifically, implementations are directed to using a doubly stochastic forecasting model to forecast incoming call volume and other parameters within a service environment, by simultaneously modeling based on multiple different time scales such as both intra-day and inter-day modeling.

In general, innovative aspects of the subject matter described in this specification can be embodied in methods that include operations for routing service requests in a service environment, including: receiving first call volume information that describes call volume in the service environment during a first period of time, providing the first call volume information as input to a doubly stochastic forecasting model and receiving, as output from the doubly stochastic forecasting model, second call volume information that includes predicted call volume during a second period of time after the first period of time, wherein the doubly stochastic forecasting model generates the predicted call volume by simultaneously modeling the call volume on multiple different time scales, and dynamically routing at least one service request that is received in the service environment based at least partly on the predicted call volume. Other implementations of this aspect include corresponding systems, apparatus, and computer programs, configured to perform the actions of the methods, encoded on computer storage devices. Implementations can optionally include one or more of the following features.

In some implementations, the multiple different time scales include an intra-day time scale and an inter-day time scale.

Some implementations include training the doubly stochastic forecasting model using training data that includes call volume information corresponding to the multiple different time scales.

In some implementations, the first call volume information further describes call wait times and call handling times in the service environment during the first period of time, and the second call volume information further includes predicted call wait times and predicted call handling times during the second period of time.

In some implementations, the predicted call volume is further based on at least one exogenous variable.

In some implementations, the predicted call volume includes: a first predicted call volume for calls associated with a first skill code of service representatives (SRs) in the service environment and a second predicted call volume for calls associated with a second skill code of SRs in the service environment.

Some implementations include attempting to predict the call volume during the second period of time using a first time scale model that is based on a first time scale of the multiple different time scales based on determining that the output of the doubly stochastic forecasting model does not converge. Some implementations include attempting to predict the call volume during the second period of time using a second time scale model that is based on a second time scale of the multiple different time scales based on determining that the output of the first time scale model does not converge. In some implementations, the first time scale is an intra-day time scale and the second time scale is an inter-day time scale.

Some implementations include attempting to predict the call volume during the second period of time based on an overall average call volume based on determining that the output of the second time scale model does not converge.

Other implementations of any of the above aspects include corresponding systems, apparatus, and computer programs that are configured to perform the actions of the methods, encoded on computer storage devices. The present disclosure also provides one or more computer-readable storage media coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and one or more computer-readable storage media coupled to the one or more processors having instructions stored thereon which, when executed by the one or more processors, cause the one or more processors to perform operations in accordance with implementations of the methods provided herein.

Implementations of the present disclosure provide the following technical advantages and/or technical improvements over previously available solutions. In traditional service environments, incoming call routing may involve a number of administrators who determine which particular call center (e.g., group of service representatives) and/or particular service representative is to receive and handle a particular call from a customer. Moreover, traditional call routing systems (either automatic or manual) may be prone to errors in which requests are misrouted, and subsequently require one or more rerouting operations to attempt to find the appropriate service representative to service a request. Also, traditional call routing systems may not be based on accurate forecasts of call volume, leading to an imbalance of load for call handling between individual SRs and/or different call center, thus creating inefficiencies and longer wait times than would otherwise be present. Implementations address these problems by providing a forecast (prediction) of call volumes, call wait times, and/or call handling times based on a doubly stochastic model, the forecast being more accurate than traditional techniques, and using the more accurate forecast to provide more efficient routing the incoming request(s) to a particular service representative and/or call center(s) suitable to handle the incoming request(s). By providing for more accurate routing of requests, and more efficient load balancing between call centers and/or SRs, implementations do not consume the processing power, memory, and/or other computing resources that traditional systems consume to recover from errors in routing and/or re-routing of requests following an erroneous routing decision, and to rebalance call volume. Accurate forecasts also allow for proper staffing solutions and can provide input to contact center optimization modeling efforts.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
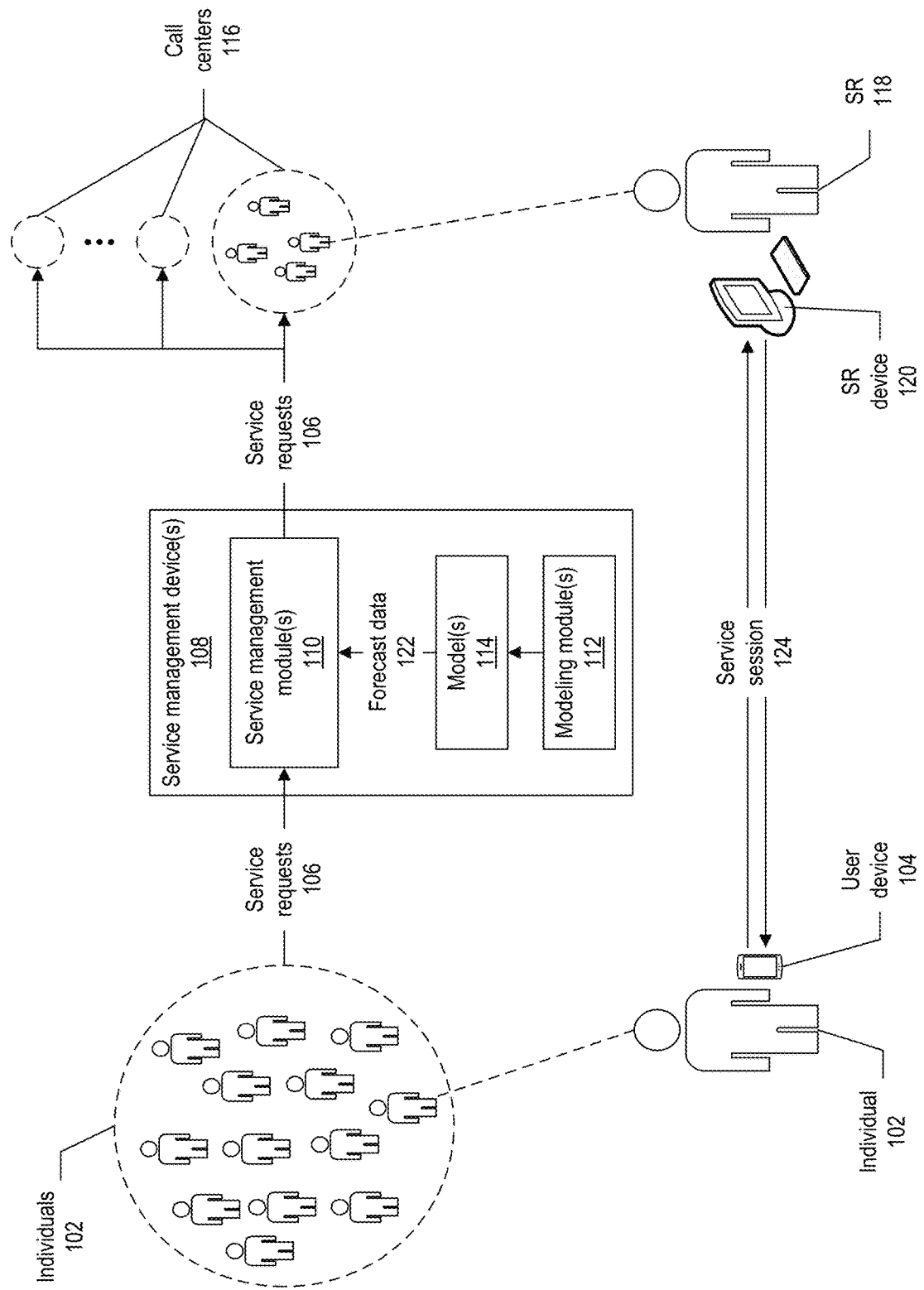
FIG. 1 depicts an example system for forecasting and routing in a service environment, according to implementations of the present disclosure.

Implementations of the present disclosure are directed to systems, devices, methods, and computer-readable media for forecasting service request volume, and for dynamic routing of incoming routing service requests in a service environment that includes one or more call centers. Implementations apply a doubly stochastic modeling technique to model call volumes, call wait times, call handling times, and/or other parameters in a service environment. The service environment can include one or more call centers, and can also employ multiple skill codes for the SRs. By simultaneously modeling on different time scales, such as modeling both inter-day and intra-day correlations, implementations are able to provide an analysis that exploits more of the structure in the data compared to traditional techniques. Implementations can also integrate other types of time series data for other effects that may impact the call volume or other parameters in a service environment. Such other effects may be described as exogenous and/or anomalous variables, given that they may be independent of other inter-day and/or intra-day trends exhibited in the data. For example, exogenous variables can include the effect of a holiday, whether it is currently tax preparation season, particular marketing campaigns, events, weather, and so forth. By using a generalized linear mixed model solution to the doubly stochastic method, implementations can readily add such anomalous variables into the analysis and take them into account for the forecasting and routing decisions.

In some implementations, modeling may be based on various skills codes that describe particular skills (proficiencies) of service representatives (SRs) in the various call center(s) of a service environment. Incoming calls may be routed at least partly based on the skill(s) that are relevant to a topic of the call. For example, certain SRs may be proficient in handling questions regarding home mortgages, and incoming calls related to home mortgages may be preferentially routed, where possible, to such SR(s). The forecasting described herein may develop forecasts of call volume, wait times, and/or handling times for calls associated with particular skill code(s). For example, modeling may be based on hundreds of skill codes across a large financial services enterprise. This implementation automatically fits optimal models to all skill codes without analyst intervention.

In some implementations, the modeling can follow at least one of four possible paths. Initially, an attempt can be made to model with maximal possible structure based on both intra-day correlations (e.g., looking for correlations within a particular day) and inter-day correlations (e.g., looking for correlations between different days), as a doubly stochastic modeling. If the doubly stochastic modeling does not converge correctly, e.g., if the model does not converge after a variable or predetermined number of iterations, thus indicating that too much structure has been applied, implementations may attempt a reduced model based on intra-day effects, such as looking at correlations between time periods (e.g., 30 minute time periods) within the day. If that model does not converge correctly, implementations may attempt a further reduced model based on inter-day correlations. If that model does not converge correctly, modeling can be based on an overall average. In some implementations, the doubly stochastic modeling may perform the modeling for inter-day and intra-day correlations simultaneously (in parallel), instead of separate modeling for the two time scales performed serially.

Implementations may use the modeling described herein to forecast call volume, calling wait times (e.g., time in queue for incoming calls), and/or call handling times for requests handled within call center(s) of a service environment. In some examples, a daily forecast may be performed at the beginning of each day, using the simulation described herein. The forecast can be used for call routing, load balancing, and/or other optimizations throughout the day, to enable optimal operation of call centers and dynamic adjustment of routing and load balancing throughout the day.

Incoming call volume to a service environment can have a structure or pattern on different time scales, such as intra-day and inter-day patterns. For example, an increase from 2:00 p.m. to 2:30 p.m. can correlate to a same (or similar) increase exhibited from 2:30 p.m. to 3:00 p.m. on the same day. Such intra-day correlations can be modeled using the implementations described herein. As another example, an increase from Tuesday to Wednesday during a week can correlate to a same (or similar) increase exhibited from Wednesday to Thursday during the same week. Such inter-day correlations can also be modeled. Implementations can take into account patterns (e.g., cyclical behavior) on such different scales, and/or other time scales as appropriate. Modeling based at least partly on intra-day correlations enable more dynamic and faster adjustments to changes to call routing, SR staffing, and/or other criteria than would otherwise be possible through use of modeling on a single time scale (e.g., intra-day only). Implementations also take into account exogenous events, also described as special or anomalous occurrences, such as an occurrence of a holiday. Implementations described herein allow for the creation of a variable that accounts for such occurrences and that is incorporated into the modeling. The simultaneous analysis on both inter-day and intra-day time scales can be performed using a generalized linear mixed model.

In some implementations, the analysis may include reduction or filtering to reduce the amount of data used in the analysis. For example, reduction can select particular periods of data that are more important to the prediction and omit others. In some instances, reduction may also reduce the number of skills that are being modeled for. The model can be trained using input data that describes historical call volume and skills relevant to the incoming calls, and the call centers (e.g., business units) that the calls were routed to, wait times, handling times, and/or other historical data. In some examples six to eight weeks worth of training data can be used to train the model, which is then used to forecast call volume, handling time, wait time, and/or other parameters for the following one to two weeks. Forecasting may be made in time periods, such as 30 minute, 15 minute, and/or 5 minute segments, and/or any other desired level of granularity, such that the output forecast provides a prediction of call volume, wait times, and/or handling times during one or more future time periods at the desired granularity.

Based on the forecast, routing of incoming calls may be performed dynamically (in real time) throughout the day as incoming calls are received. The forecasts can also be used for future capacity planning and scheduling (e.g., for the subsequent two weeks), to schedule personnel (e.g., SRs) and shifts in the call centers, and/or to schedule computing resources such as server capacity, network capacity, and so forth. For example, when deciding how to route an incoming call to a particular call center and/or SR, the forecast of expected wait time for a call center may be determined as a function of the number of calls in queue, the average handling time for the call types (e.g., skills required of calls), and how many SRs are available in each call center with the suitable skills. The incoming call can be routed to the call center with the lowest expected delay (e.g., among call center(s) with the appropriate skill code(s) to handle the incoming call), based on the forecast.

In some implementations, other considerations can be taken into account when making routing decisions. For example, calls with a high likelihood for deepening (e.g., selling new products to customers) can be sent to those SRs who have been the most successful at deepening. Implementations can incorporate filters and/or rules to take such deepening likelihood into account. For example, a deepening likelihood (e.g., percentage likelihood for successful deepening) can be determined for each incoming call, and if the likelihood exceeds a threshold value, the analysis can include an additional variable that accounts for sending the call to a particular call center and/or SR with demonstrated aptitude for deepening. Accordingly, implementations can modify a routing process (e.g., that includes load balancing) based on a likelihood for deepening or other considerations. In general, load balancing based on the forecasting described herein provides for shorter wait times, more efficient handling of calls, better balance between call centers, and overall a more positive experience for customers in the service environment.

Quality professionals have expanded their sphere of influence to include many industries that often have time series with dependency between observations. Modeling methods account for this autocorrelation to provide accurate process control measures and forecasts. In some environments, multiple seasonality components are present that may lead to extending the traditionally applied smoothing and Box Jenkins Autoregressive Integrated Moving Average models. Doubly stochastic methods applied by implementations described herein allow not only the data to vary about a mean value of a parameter, but also allow for the data to vary about the parameter itself. Such autocorrelation is applied along with seasonality, and the doubly stochastic estimator uses call volume data describing the number of calls arriving at a representative service center. Implementations employ a doubly stochastic model as described herein, which can be applied to data series across any appropriate number of skills (e.g., fifteen) that may be relevant within a service environment.

FIG. 1 depicts an example system forecasting and routing in a service environment, according to implementations of the present disclosure. As shown in the example of FIG. 1, a plurality of individuals 102 may each employ a user device 104 to generate a service request 106. The service requests may be communicated, over one or more networks, to one or more service management modules 110 executing on one or more service management devices 108 in a service environment.

The user device 104 may include any suitable type of computing device, such as a desktop computer, laptop computer, tablet computer, smartphone, wearable computer, and so forth. The computing device may be a portable computing device (e.g., smartphone, wearable computer) or a non-portable (or less readily portable) computing device. In examples where the individual 102 contacts the service environment through a telephone call, the user device 104 may be a telephone that may or may not also be a computing device. For example, the user device 104 may be a smartphone, or may be a traditional telephone that is not also a portable computing device. The service management device(s) 108 may include any suitable number and type of computing devices, such as server computers, distributed computing devices (e.g., cloud servers), network servers, network gateways, front end servers, back end servers, and so forth.

The service request 106 from an individual 102 may be received by one or more request interfaces provided by the service management device(s) 108. As described above, implementations support various communication channels. The submission of a service request 106, and/or the particular request interface that receives the service request 106, may vary based on the communication channel used by the individual 102 to send the service request 106. For example, an individual 102 may use a voice telephony network or data network to make a telephone and/or VOIP call to a call center. In such examples, the request interface may enable the individual 102 may navigate through a sequence of audio menus and/or communicate with an interactive voice response (IVR) system to generate a service request 106 based on the individual's speech inputs and/or inputs through a telephone numeric keypad. As another example, an individual 102 may access a request interface through an online application and/or web application to submit a service request 106 for a real time text chat session, video chat session, and/or audio chat session. In some instances, the individual 102 may send a service request 106 in the form of an email to an address associated with the service environment, and the request interface may be configured to handle email communications arranged according to a version of internet message access protocol (IMAP), simple mail transfer protocol (SMTP), or some other protocol. In some instances, the individual 102 may send a service request 106 in the form of a text message to a phone number associated with the service environment, and the request interface may be configured to handle text messages sent via a version of short message service (SMS), multimedia messaging service (MMS), and/or other suitable messaging protocol.

In any of these situations, and/or other types of service environments, the predictive routing of the service request described herein enables the routing of the individual request (e.g., incoming call) to bypass the default handling of the service request, and be connected directly to an SR who is suitable to handle the individual's service request. For example, after the category (e.g., intent, what they are calling about) of the individual is determined based on the individual's previous action(s) performed in an application (e.g., mobile app, web application, etc.), the individual may call into the IVR system of the service environment and, instead of going through the typical, default series of selections in the IVR tree, the individual may be routed directly to an SR who is available and appropriate for their particular category. In some instances, this routing may be performed after asking the individual to confirm that the predicted intent is the individual's actual intent, as described further below.

The service management module(s) 110 may perform routing decisions to route incoming service requests 106 (e.g., calls) to the appropriate call center 116 and/or SR 118 within a call center 116. The service environment can include any suitable number of calls centers 116, which may correspond to business units, products, and/or skills. A call center 116 may handle service requests 106 for calls related to a particular business unit, or various business units. Each call center 116 can staff any appropriate number of SRs 118 at any given time.

To perform the routing decisions, the service management module(s) 110 can employ forecast data 122 generated by model(s) 122 that are developed by modeling module(s) 112 as described further herein. The forecast data 122 can include predictions of incoming call volume, handing time, wait time, and/or other parameters relevant to routing decisions.

The routing of a service request 106 results in the establishment of a service session 124 between the individual calling and a suitable SR 118, in which the individual 102 and the SR 118 respectively use their user device 104 and SR device 120 to exchange communications during the service session 124.

As described herein, a service session may include any number of communications between an individual (e.g., a customer) and a SR. In some examples, a service request (e.g., question, complaint, inquiry, etc.) may be submitted by an individual via a telephone call, a real-time chat session, text message, email, or other communications channel. The service request may be routed to a SR, and the SR may respond to the initial request with a voice response, text response, or otherwise. In some instances, the SR may respond to the service request through the same communication channel as that used by the individual to submit the service request. Accordingly, the service session may be conducted through the communication channel initially used by the individual. For example, the individual may call into a service center using their telephone, a voice over internet protocol (VOIP) application, or otherwise. The call may be routed to a particular SR, who may then conduct the service session with the individual using the telephone connection, VOIP connection, or otherwise. In other examples, the individual may contact a service center through video chat, instant messaging (IM), social media messaging, email, or through other communication channels, and the service session may be conducted through the initially selected communication channel. During the service session, the individual may submit any number of communications, and the SR may respond in turn. Accordingly, a service session may constitute a conversation between the individual and the SR that includes any number of communications sent between the parties, serially and/or in parallel, over any appropriate period of time. A service session may be conducted in real time as a conversation between the SR and the individual, such a telephone conversation, IM chat session, video chat session, VOIP conversation, and so forth. A service session may also be conducted through the exchange of communications that are not in real time, such as an exchange of email messages. A service session may also include the exchange of screen shots, images, audio files, video files, and/or other types of files or any other appropriate type of documents to facilitate the conversation between the SR and the individual.

In some implementations, the service management device(s) 108 may provide a SR UI that enables an SR 116 to interact with an individual 102 during a service session 124. The SR UI may also be described as an SR portal, and may display information regarding the individual that the SR 116 is interacting with at any given time, such as the individual's name, ID number, category of intent or interest, products/services used by the individual 102, results of previous service sessions with the individual 102, and so forth. Any appropriate number of SRs 118 may be employed in, and/or available to service individuals, within call centers 116 in the service environment, and routing a service request may include selecting a particular call center 116 and/or a particular SR 118 from the pool of available SR(s) in the selected call center, to handle the particular service request. One or more SRs 118 may each employ a SR device 120 to access the SR UI 116 and engage in service sessions 124 with individuals 102. The SR device 120 may be any appropriate type of computing device, such as a desktop computer, laptop computer, and so forth.

In response to a routing decision that selects a particular SR 118 to handle a service request from a particular individual 102, as described herein, a service session 124 may be initiated to enable communications between the SR 118 and the individual 102 over the communication channel associated with the service request 106. The service session 124 may continue until one or both parties terminate the session, and/or until the individual's problem, question, or issue is resolved. In some implementations, the one or more session management modules 122 can initiate, terminate, and/or otherwise manage service sessions 124 between SRs 118 and individuals 102.

Figure 2:
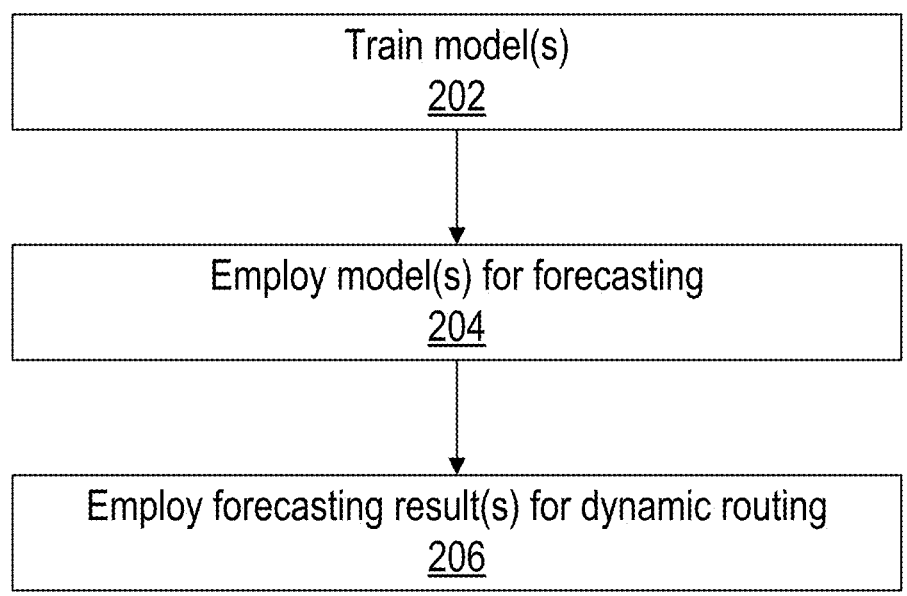
FIG. 2 depicts a flow diagram of an example process for forecasting and routing in a service environment, according to implementations of the present disclosure.

FIG. 2 depicts a flow diagram of an example process for forecasting and routing in a service environment, according to implementations of the present disclosure. Operations of the process can be performed by one or more of the service management module(s) 110, the modeling module(s) 112, the model(s) 114, and/or other software executing on the service management device(s) 108, the user device 104, the SR device 120, and/or elsewhere.

The model(s) 114 are trained (202) or otherwise developed using training data, such as historical data describing call volume, wait times, handling times, and/or other variables associated with handling requests in the service environment. The model(s) 114 are employed (204) for forecasting future call volume, wait times, handling times, and/or other variables. The results of the forecasting (e.g., the forecast data 122) describing predictions for such variables are then employed (206) for dynamic routing within the service environment. The modeling, forecasting and routing are described in further detail below.

Previously available methods for modeling and prediction used by quality professionals employ a least squares regression analysis, which can require assumptions of independent and identically normally distributed error terms (implying constant variance). Violations of normality and constant variance can potentially be solved with a transformation on the response. However, significant effort can be required to properly diagnose and model serial correlation to the point that practitioners may simply assume independence for convenience. Correlated data are pervasive across quality applications, especially when samples are close together in time. Quality engineers are getting involved in more areas beyond the industrial manufacturing setting of monitoring a traditional process. The broadened scope into sectors such as service, health care, financial services, and energy has expanded the typical patterns of time series to include multiple seasonal or cyclical components.

Implementations described herein provide an improved method to model dependent time series with complex cyclical behavior, compared to previously available solutions. As an example, consider monitoring environmental parameters such as pressure and humidity in an industrial application. There could be cyclical patterns for the time of day as the external temperature increases from the morning to the afternoon, where the current hour's measurement is related to the previous hour's reading. Similarly, data such as clothing sales could be driven by regular and predictable monthly influencers such as holidays, tax-free weeks, and back-to-school. This seasonality can be modeled effectively through a variety of previously available methods including Seasonal Smoothing, Autoregressive Integrated Moving Average, and Unobservable Components (structural) Models. These methods can be readily implemented with common statistical software, although the theory behind these methods can be quite daunting.

In practice there could be more than one seasonal component, where the effects could either be fixed or random and the call arrivals over-dispersed. One example of this more complex behavior is call volume coming into a contact center that can have seasonality defined by the time of year (e.g., higher call volume during tax season), day of the week (e.g., more calls on Mondays and Tuesdays), and/or time of day (e.g., mid-day spikes) where some of the effects are random while others fixed. Implementations provide a modification of the doubly stochastic approach using a mixed general linear model to significantly improve call center forecasting performance. Doubly stochastic implies a two-step randomization where not only are call arrivals random, but also the call arrival parameter. Call centers can include several different skills or "splits" to which a call may be routed, depending on the capabilities of the call center agents (SRs). Forecasts are produced by taking advantage of the unique correlation structure for each split while accounting for trend, seasonality, cyclical behavior, and/or serial dependence. The doubly stochastic model is the most complex as it accounts for both inter-day and intra-day structure. For splits where the full doubly stochastic model is not used, a simpler model can be automatically fit. Given that a large number of splits may need to be modeled, the method is robust enough to handle the potential patterns that may change within a split over time, the addition of new skills, and/or the implementation of new routing logic. This flexible method allows the benefit of the doubly stochastic model without expending staff hours on tedious custom-coding of individual split behaviors at regular intervals. A similar process is used to model the average handling times (AHT) for each split.

There are several challenges in modeling complex call center data. First, there are a sufficiently large number of splits (e.g., across various products) that need to be frequently modeled, such that it is impractical for the analyst to run all of the possible models and associated diagnostics across each split, particularly given that the focus may be on short term forecasts requiring multiple forecasts per week. Second, at least some of the splits may be open during weekday holidays, meaning these holidays cannot be excluded from the data. Third, due to low call counts in some of the splits, there may not be enough information to support the estimation of both the intra-day and inter-day correlation structures.

This disclosure describes the model application and improvements to account for additional call center complexity. The disclosure also describes dependent data patterns seen in quality applications. The disclosure also describes the doubly stochastic forecasting model and other aspects, provided by implementations, to automatically fit the appropriate level of complexity. The disclosure also presents results using actual data from a call center.

There are various characteristics of auto-correlated data with multiple seasonal components that may occur in quality processes. This can be typical of the patterns observed in call centers and this example is used to demonstrate the concepts and approach of the implementations described herein. The additional challenge with call center data is that the nature of the complexities may not be consistent across possibly hundreds of skills. Implementations provide an automated way to accurately model the structure with as simple a model as possible to ensure minimum variance on the forecast error.

Figure 3:
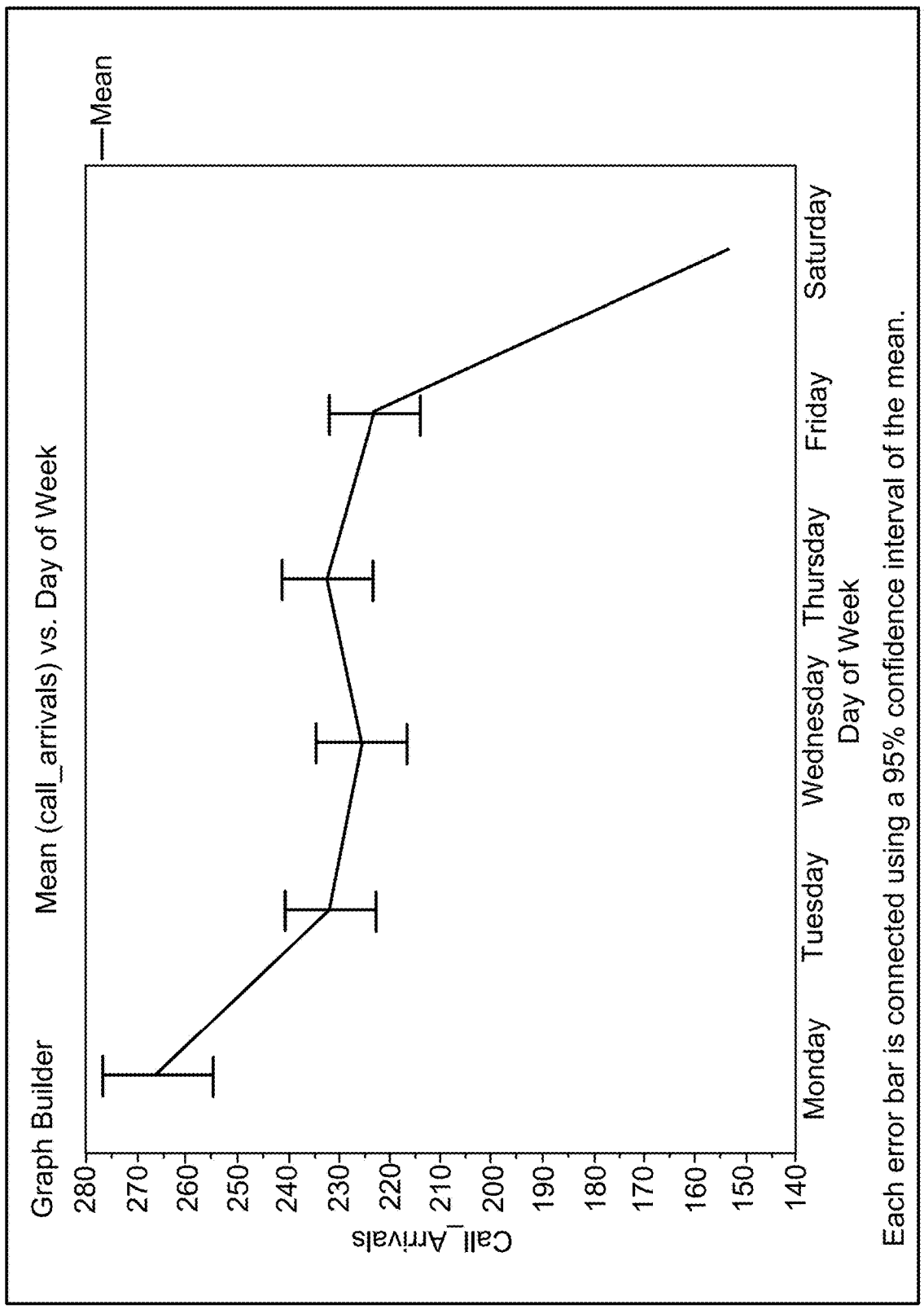
FIGS. 3-10 depict example graphs.

FIG. 3 is an example graph that shows the mean call volumes by day-of-week for a single split over a 6-month period. There are day-of-week effects present: the split is open Monday through Saturday, but consistently receives significantly more calls on Monday and fewer on Saturdays.

Figure 4:
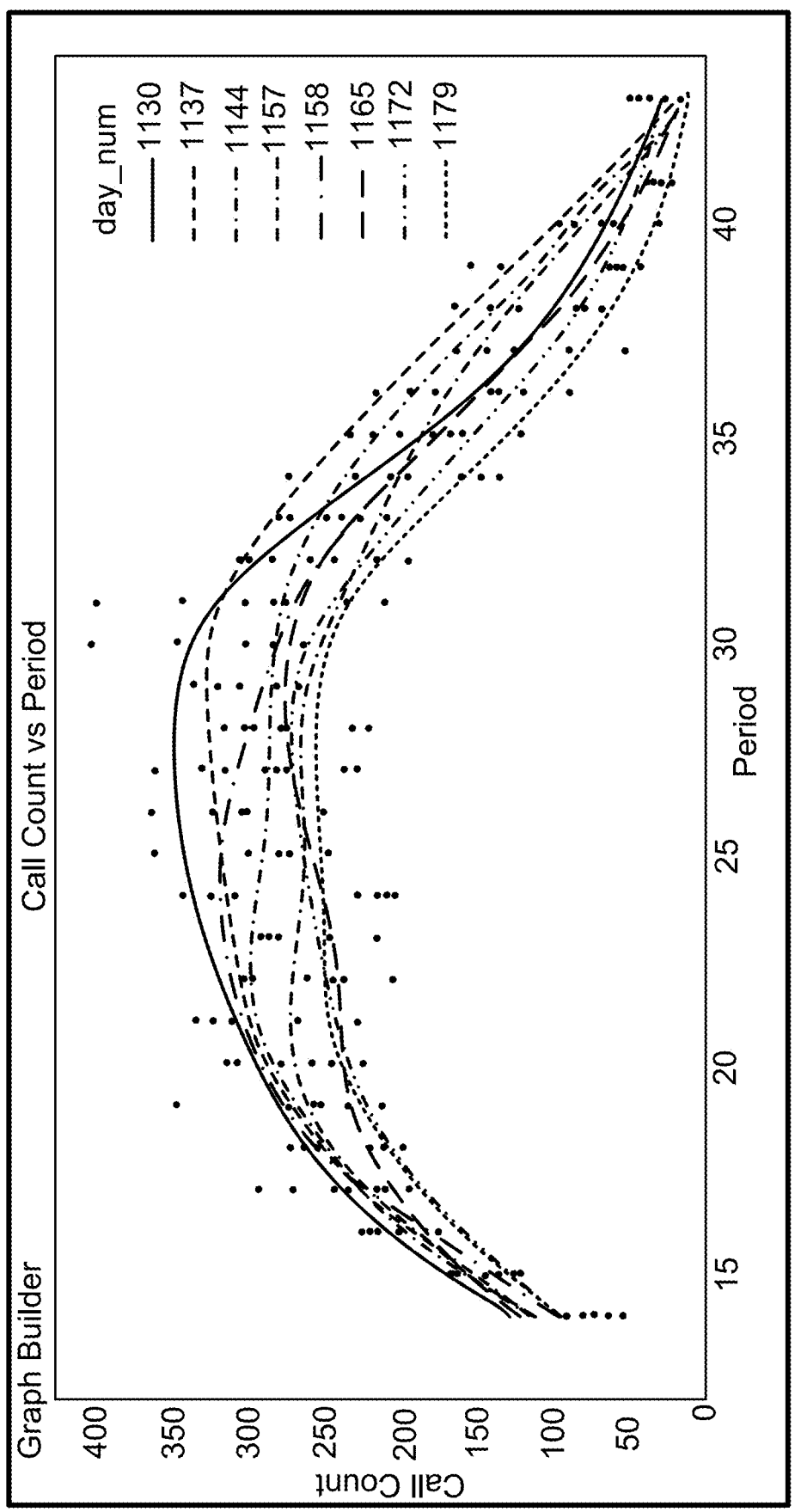

FIG. 4 is an example graph of the call volumes by thirty-minute-period over each of eight Fridays (represented by different colors in the plot) for a single split. There are also period-effects present: call volumes tend to ramp up and down from a mid-day high. The intra-day (across-period) correlation is apparent in the relatively few number of line intersections in the plot. For example, the call counts from day number 1179 (the lowest curve at period 27) are uniformly less those from 1130 (the highest curve at period 27). Knowing that a below-average number of calls were received in the first half of the day provides evidence that a below-average count may be expected for the remainder of the day. Further, while not shown, positive inter-day correlation in call center data sets suggests that a below-average total of call counts can be expected throughout the day after 1179.

Figure 5:
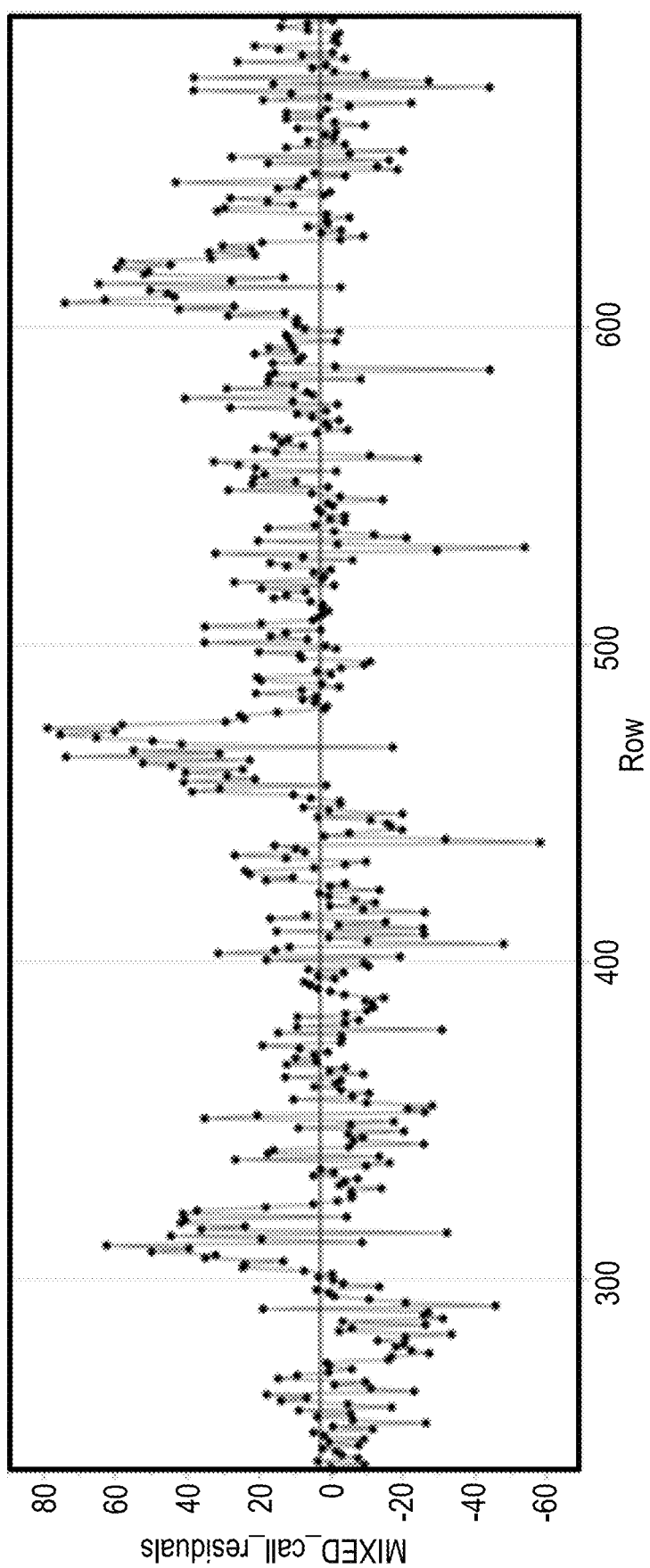

A linear regression model, calls=day_of_week×period, can be used to forecast call volume for any time period on any day that can account for both the inter and intra-day average patterns. FIG. 5 is an example graph that plots forecast errors or residuals (observed calls-predicted calls)

from the regression model using 30-minute call counts from a single split over five weeks. While the regression model assumes that these residuals represent a random white-noise process around 0 (independent and identically distributed), it appears that the residuals are positively correlated given the pattern of many consecutive periods of increasing errors followed by many with decreasing. This behavior can be often seen in autoregressive models.

Figure 6:
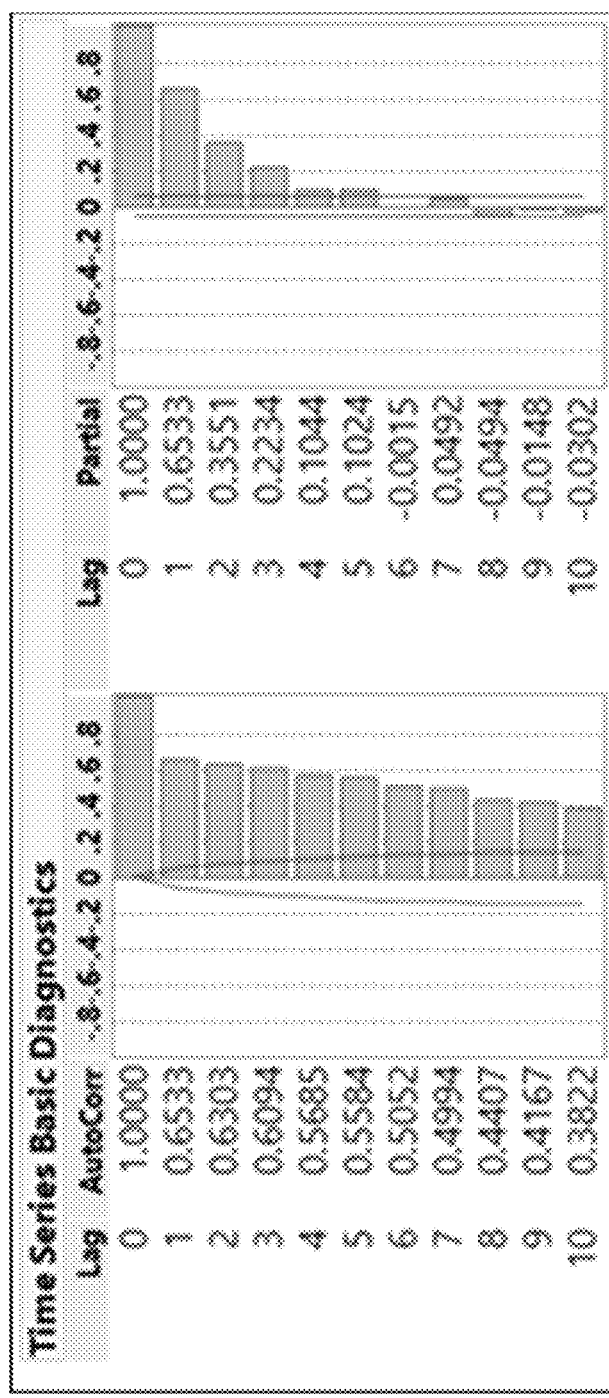

FIG. 6 is an example graph that displays the correlation coefficient between different lags of the observations (autocorrelation function, ACF) and the correlation after the effect has been removed (partial autocorrelation function, PACF). The patterns in the ACF and PACF are diagnostic plots in the time series modeling workflow and, for this example, confirm the suspected positive correlation. If the residuals behaved independently, as assumed by the regression model, none of these autocorrelations and partial autocorrelations would differ significantly from 0 (beyond the number of false positives expected by the chosen type I error rate). The blue confidence bands around 0 do show non-random behavior indicating structure between observations.

There are two distinct influences on calls that induce a correlation between some of the observed call counts, violating the independence assumption. Within a given day, some event may lead to more or fewer calls than expected. For example, unexpected behavior in the stock market in the morning may lead to an increased number of calls for the rest of the day. This is intra-day correlation. Likewise, there are systemic processes responsible for inter-day correlation. Heuristically, if the residuals are very large and positive throughout the day today caused by a weather event, for example, a larger-than-average call load may be expected for the next day.

Figure 7:
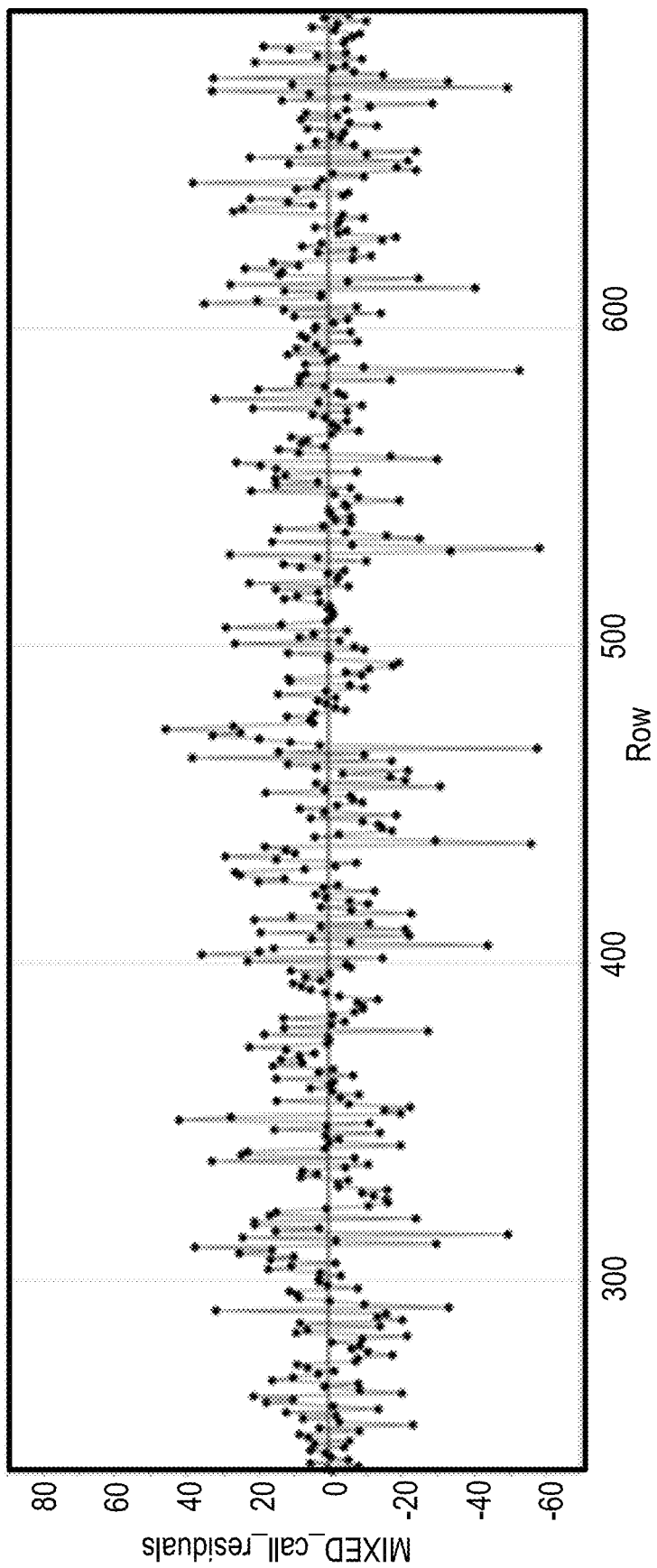

FIG. 7 is an example graph that plots the residuals from the application of the doubly stochastic model that accounts for both inter-day and intra-day serial dependence with a representative sample of actual data. This represents a substantial improvement over the fit of the plain regression model. The doubly stochastic model allows for the possible presence of lag-1 correlation in the residuals, and often largely eliminates higher-lag correlations by de-trending the day-to-day clustering within the residuals.

Figure 8:
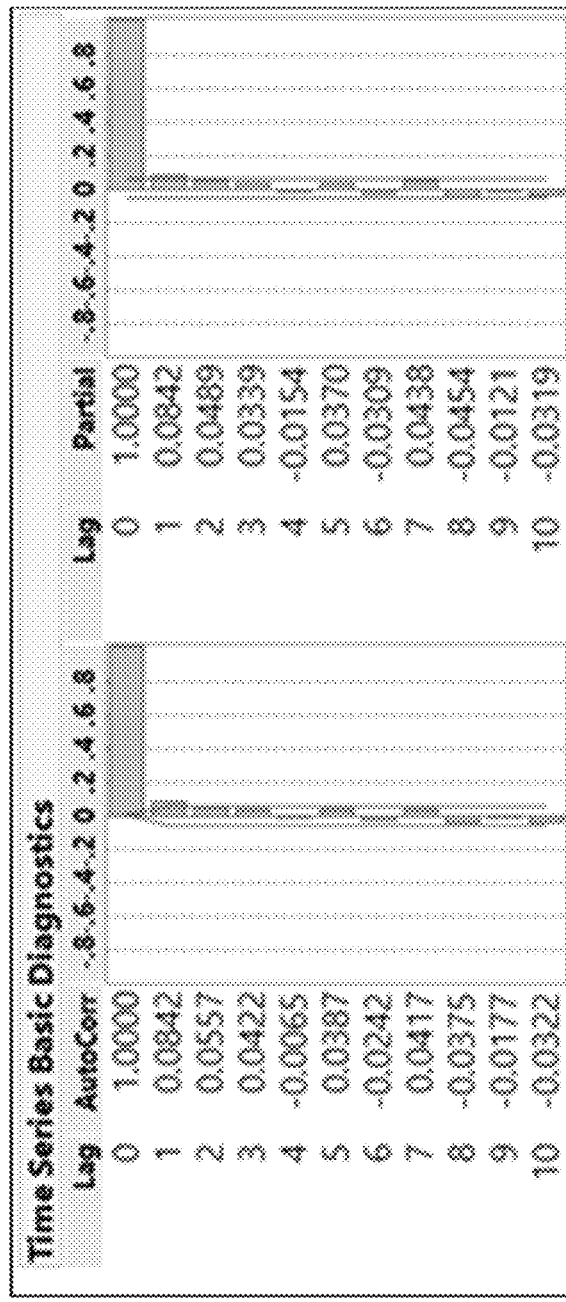

FIG. 8 is an example graph of residuals from the application of the doubly stochastic model, which indicates the residuals are independent white-noise with no correlation between lags higher than lag-1. In short, the flexibility of the doubly stochastic model provides a better fit to the call center process, and tend to produce more accurate predictions and 95% prediction intervals than the regression model.

Call center regression models can include a day-of-week by period-of-day interaction. In a call center open five days per week with thirty half-hour periods per day, this interaction involves 150 parameters. In addition, a call center may employ forecasting for some of the splits during holidays but not others, e.g., these splits remain open on holidays while others close. In order to capture this behavior, implementations can include a holiday indicator (holiday_ind) by period interaction effect in the model. However, some training data sets may include only a single holiday, leading to high variance in the parameter estimates for this effect (each period observation from that one day becomes the new estimate for that period during holidays). To reduce the variability of these estimates, implementations can group three periods together on holidays. That is, periods {1, 2, 3} are assigned p_group=1, periods {4, 5, 6} are assigned p_group=2, etc. The p_group×holiday_ind interaction is included in the fixed effect structure as an additive effect.

Figure 9:
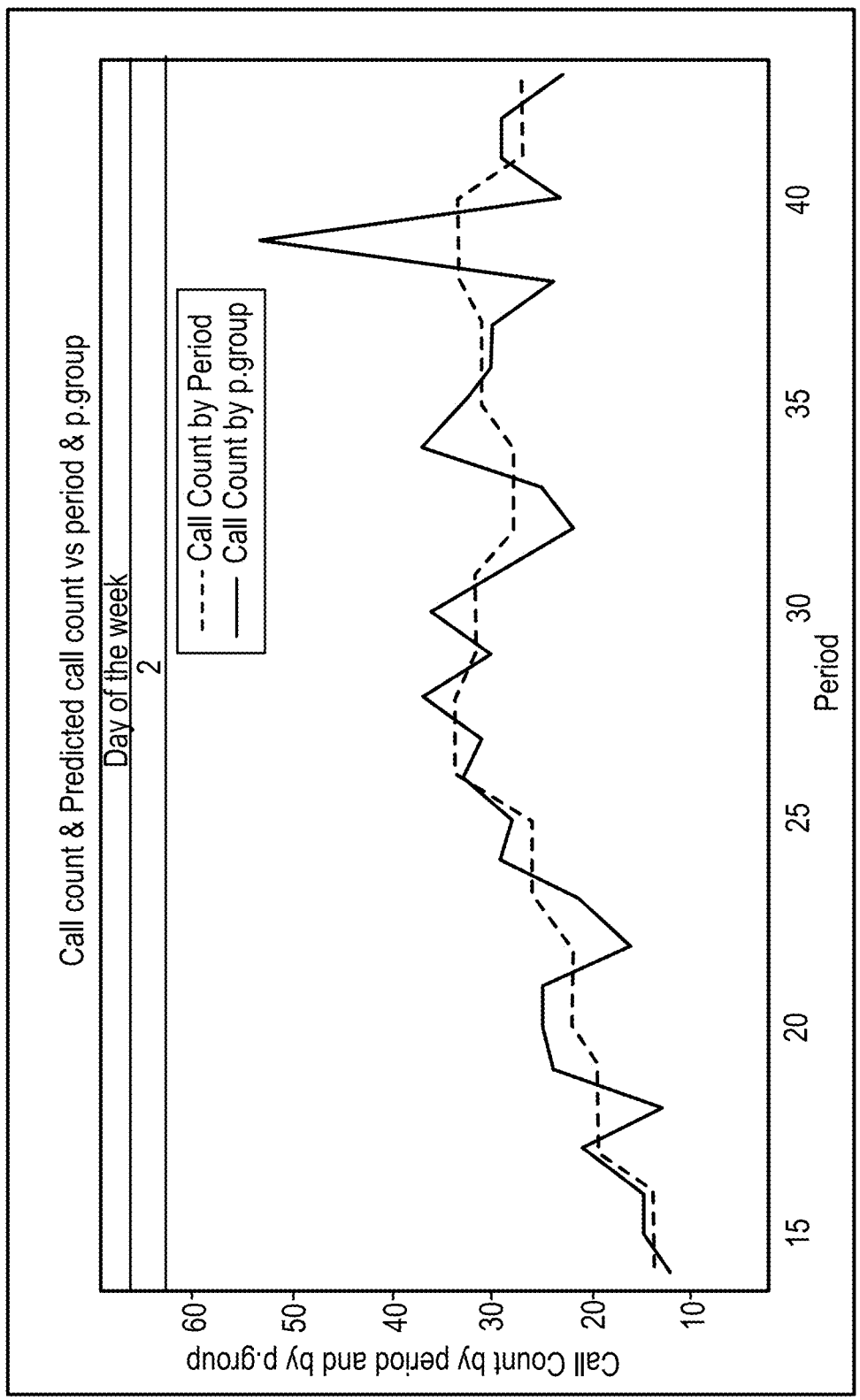

FIG. 9 is an example graph that compares the call counts over each period of a holiday (line) with the smoothed call counts over p_group (dashed), with half-hour period measurements (line) plotted with smoothed 1.5-hourly measurements (dashed) for a single holiday.

A Poisson process, Poisson($\lambda$), produces a right-skewed distribution with mean $\lambda$ and variance $\lambda$. Modeling call counts within time intervals (periods) assumes a homogenous arrival rate within each interval (period). The rate parameter, $\lambda(t)$, of an inhomogeneous Poisson process, Poisson($\lambda(t)$), is deterministic and depends on time. Modeling call arrivals during different intervals throughout a day is an example of fitting an inhomogeneous Poisson process. For example, t may represent the 30-minute period of the day.

In a doubly stochastic Poisson process, the rate parameter $\lambda(t)$ is itself a random process. For example, the rate for Friday at period 20 may depend not only on the historical rate observed during period 20 on Fridays, but also on the departure of the observed rates on Thursday from the expected rates.

Linear mixed models typically assume that the residual variance is independent of the mean, although this assumption is violated by a Poisson process. Implementations may apply a variance stabilizing transformation, $$y = \sqrt{c + 1/4},$$

to the call counts, c, within each period. The transformed call counts are approximately normally distributed with a constant variance of 0.25. This variance stabilizing transformation allows us to use linear mixed models, without having to use the more computationally-complex generalized linear mixed models. Experiments were performed with mixed Poisson regression, but this approach showed no improvement in predictive performance despite a steep computational cost.

In some implementations, a linear mixed model is fit with correlated errors to the transformed call counts $Y=X\beta+Zb+\epsilon$, where Y is the vector of transformed call counts, X is a matrix containing the levels of the fixed effects for each observation, $\beta$ is the vector of fixed effects parameters containing a day-of-week×period-of day interaction and a p_group×holiday-indicator interaction, Z is a binary coefficient matrix for the random day-to-day effects in the model. There is one column for each day in the data. Moreover, $b \sim N(0, G)$ is the vector of random day-to-day effects. Each unique day in the data set is represented by one random effect in b.

Implementations can assume that the number of calls received each day (after accounting for day of the week and other variables) follows a first-order autoregressive structure, AR(1). The true distance between days is preserved, meaning Fridays and Mondays are considered to be three time periods apart (and thus have a weaker correlation than adjacent weekdays), per Example Formula 1 below.

Example Formula 1

$$G = \sigma_g^2 \begin{bmatrix} 1 & \rho & \rho^2 & \cdots & \rho^n \\ \rho & 1 & \rho & \cdots & \rho^{n-1} \\ \rho^2 & \rho & & & \vdots \\ \vdots & \vdots & & \ddots & \rho \\ \rho^n & \rho^{n-1} & \cdots & \rho & 1 \end{bmatrix}$$

In this example, $-1<\rho<1$ and $\varepsilon \sim N(0, R)$, is the vector of error terms (residuals).

In some example, $\varepsilon$ can potentially follow an AR(1) process by assuming $\varepsilon \sim N(0, R)$, where R follows the same structure (within days) as G above. Thus, R is a block-diagonal matrix, with one block for each day in the data set. This accounts for the potential correlation in residuals from proximal periods within days. Ignoring correlation between subsequent observations leads to inaccurate standard errors and prediction intervals. In addition, although the estimates from a linear regression may be unbiased in the presence of correlated residuals, they may not be efficient.

Implementations provide various advantages of modeling day-to-day correlations with random effects. There are practical implications of using random instead of fixed effects for the within-day means. First, the empirical best linear unbiased predictors (EBLUPs) for the random effects are shrunk towards the mean. For example, suppose that the average day-to-day effect is 0, and that in each time period yesterday, five more calls were received than expected (on the transformed scale). If the day-to-day effect is treated as a fixed effect, then the estimate for yesterday's parameter is 5. Treated as a random effect, yesterday's parameter is a weighted average of 0 and 5 (depending on the relative size of the day-to-day variability and the residual variability). This can help prevent over-fitting. Another related advantage is that adding levels of a random effect does not use up degrees of freedom. Each additional level of a fixed effect uses one degree of freedom. Thus, using random instead of fixed effects is a form of regularization that can lead to more precise standard errors and predictions.

While the random day-effect is constant in a day on the transformed scale, it is not constant with respect to its impact on the number of calls expected. For example, suppose the expected marginal (mean) call count is 40 at 8 am and 100 at noon. If the EBLUP for a given day is 3, then the conditional (on the random effect of 3) expected call counts are $(\sqrt{40.25}+3)^2 - 0.25 \approx 87$ and $(\sqrt{100.25}+3)^2 - 0.25 \approx 169$, respectively. Because of the square root transformation, the expected deviation of 3 on the transformed scale translates to deviations of 47 and 69 on the data (call count) scale.

Further, the predictions for future call volume depend not only on the fixed effects (day of week, time period, holiday), but also on recent call volumes due to the AR(1) structure for G (day-to-day effects). For example, suppose the EBLUP for the random effect of the last day in a given training set (Day 0 of the forecast set) is 2 and the fixed effects expect 100 calls at noon. When the fixed effects and random effects are combined, the expected conditional call count on that day is $(\sqrt{100.25}+2)^2 - 0.25 \approx 144$. In addition, suppose the AR(1) coefficient from the G matrix is 0.8. Assuming that the fixed effect structure predicts a mean of 100 calls for noon in each of the next 6 days in the forecast, the expected call counts are shown in Table 1 below.

TABLE 1

| Day | Fixed-Effect Call Prediction at Noon | Expected All-Day Deviation (transformed scale) | Expected Call Count at Noon |
| --- | --- | --- | --- |
| 0 | 100 | $2 \times 0.8^0 = 2.000$ | $(\sqrt{100.25} + 2.000)^2 - 0.25 \approx 144$ |
| 1 | 100 | $2 \times 0.8^1 = 1.600$ | $(\sqrt{100.25} + 1.600)^2 - 0.25 \approx 135$ |
| 2 | 100 | $2 \times 0.8^2 = 1.280$ | $(\sqrt{100.25} + 1.280)^2 - 0.25 \approx 127$ |
| 3 | 100 | $2 \times 0.8^3 = 1.024$ | $(\sqrt{100.25} + 1.024)^2 - 0.25 \approx 122$ |
| 4 | 100 | $2 \times 0.8^4 = 0.819$ | $(\sqrt{100.25} + 0.819)^2 - 0.25 \approx 117$ |
| 5 | 100 | $2 \times 0.8^5 = 0.655$ | $(\sqrt{100.25} + 0.655)^2 - 0.25 \approx 114$ |
| 6 | 100 | $2 \times 0.8^6 = 0.524$ | $(\sqrt{100.25} + 0.524)^2 - 0.25 \approx 111$ |

In Table 1, expected call counts for six future days in the noon period are shown, assuming a fixed-effects prediction of 100 for each of the six days and that the random effect for Day 0 was 2.

In order to request the forecasts, extra rows can be added to the training data with appropriate entries for the input columns and empty entries for the target columns. For forecasts far enough in the future, the deviations due to the day-to-day correlation may be dampened to 0. However, even in these situations it is still beneficial to employ the doubly stochastic model, since the presence of day-to-day correlation impacts the efficiency of the fixed-effects parameter estimates. The benefits of the doubly stochastic model are even more visible when standard errors and prediction intervals are considered.

The full model allows for complex correlation structures. However, for some splits (within particular training data sets), there may be only sporadic and sparse occurrences of call arrivals. This can lead to slow or stalled model convergence in some cases. This has previously been addressed by estimating the doubly stochastic model in two steps. First, the inter-day correlation is estimated using the total call counts from each day. These parameters are then held constant while the parameters for the intra-day correlation are estimated. However, this may not produce a substantially higher convergence success rate from this two-step approach over the one-step approach when applied to our call center data. In this regard, implementations differ from previously available solutions in that implementations can fit all of the model parameters jointly. This can lead to reduced bias in the estimates for the models that do converge. Furthermore, implementations provide improved convergence rates by changing the convergence criterion. By default, statistical packages such as SAS can ensure that the sum of squared parameter gradients (weighted by the current Hessian of the parameter estimates) is sufficiently small. However, in the presence of strong correlations in the doubly stochastic model, the parameter estimates may lie near the boundary of the parameter space, meaning the gradients may not approach 0 with convergence. As an alternative, implementations declare convergence when the relative change in the log likelihood between iterations is sufficiently small.

Example Code 1 below provides example (e.g., SAS) code for the Doubly Stochastic Model.

Example Code 1

```
/* e.g., The Full Model */
proc mixed data = training data noclprint scoring=30 convf=1E-6
maxiter=150
    maxfunc=1000;
    class day_of_week period day_num split p_group;
```

Example Code 1

```
    by split;
    /* The fixed effects */
    model transf_call count=day_of_week*period p_group*holiday_ind /
notest noint
        ddfm=residual outp=pred_call_count_output;
    /* The day-level random effects */
    random day_num / type=sp(pow)(day_num_copy);
    /* The period-level correlated residuals */
    repeated period / type=ar(1) subject=day num;
run;
```

Example Code 1 provides example SAS code to implement the doubly stochastic model. The variables have been described previously except for day_num and day_num_copy. These are both used to represent the number of days from a fixed time point in order to record the temporal separation of observations. Because day_num needs to be listed in the CLASS statement, the numeric day_num_copy is present to use in the specification of the correlation structure. There are a few settings in PROC MIXED that have proven useful:

scoring=30 instructs SAS to use Fisher Scoring for the first 30 iterations, instead of the default Newton-Raphson algorithm. Fisher Scoring is more stable for models with complex covariance structures and can lead to better estimates of the asymptotic covariance.

maxiter=150 increases the maximum number of iterations attempted to 150 (the default is 50).

convf=1E-6 changes the convergence criterion.

maxfunc=1000 increases the maximum allowed number of likelihood function evaluations.

notest saves time by skipping the hypothesis tests for the fixed effects.

ddfm=residual request the least computationally expensive method for calculating denominator degrees of freedom since no standard errors or tests are used in our application (only point estimates).

type=sp(pow)(day_num_copy) requests an AR(1) structure in the presence of unequally spaced time points. Implementations can treat Fridays and Mondays as three days apart, even though they represent subsequent weekdays. This has been confirmed using validation data that this setting typically performs at least as well as (and often better than) using type=ar(1).

For cases (e.g., splits within a given set of training data) where the model fails to converge, Implementations attempt to fit a reduced model, as shown in the example of the First Reduced Model shown in Example Code 2 below. This is programmed to happen automatically: the code checks for splits with missing predictions, and runs the model on those splits. The reduced model fits the transformed call counts with a simpler model that allows for inter-day correlation but not intra-day correlation. That is, it fits $Y=X\beta+Zb+\varepsilon$, with $\varepsilon \sim N(0, \sigma^2 I)$, where I is an identity matrix with dimension equal to the number of observations.

Example Code 2

```
/* e.g., The First Reduced Model */
proc mixed data=training_data noclprint scoring=30 convf=1E-6
maxiter=150
    maxfunc=1000;
    class day_of_week period day_num split p_group;
    by split;
    /* The fixed effects */
    model transf_call_count=day_of_week*period p_group*holiday_ind /
notest noint
        ddfm=residual outp=pred_call_count_output;
    /* The day-level random effects */
    random day_num / type=sp(pow)(day_num_copy);
run;
```

The choice to omit the period-to-period correlation first is made based on the consideration that the day-level random effects can have a larger influence on the point-estimates for the forecast period. If the first reduced model fails to converge, a second reduced model is fit as shown in Example Code 3. The second reduced model omits the day-level random effects, but re-introduces the flexibility for fitting period-to-period correlation within days.

Example Code 3

```
/* e.g., The Second Reduced Model */
proc mixed data=training_data noclprint scoring=30 convf=1E-6
maxiter=150
    maxfunc=1000;
    class day_of_week period day_num split p_group;
    by split;
    /* The fixed effects */
    model transf_call_count=day_of_week*period p_group*holiday_ind /
notest noint
        ddfm=residual outp=pred_call_count_output;
    /* The period-level correlated residuals */
    repeated period / type=ar(1) subject=day_num;
run;
```

For any splits that also fail to converge with this model (typically those with only a few calls recorded), implementations can automatically fit a third reduced model: a linear regression without allowing for inter- or intra-day correlation. That is, $Y=X\beta+\varepsilon$ is fitted with $\varepsilon \sim N(0, \sigma^2 I)$ where I is an identity matrix with dimension equal to the number of observations. The Third Reduced Model is shown in Example Code 4.

Example Code 4

```
/* e.g., The Third Reduced Model */
proc mixed data=training_data noclprint;
    class day_of_week period day_num split p_group;
    by split;
    /* The fixed effects */
    model transf_call_count=day_of_week*period p_group*holiday_
ind / notest noint
        ddfm=residual outp=pred_call_count_output;
run;
```

Implementations can follow the same approach when modeling AHTs, although there is typically not much evidence of day-to-day correlation. There is likewise often little evidence of a day-of-week by period interaction, or simply of a day-of-week effect. Because there are periods of the day that may not receive any calls in some of the smaller splits (resulting in missing data instead of zeros, as with the call counts), a fourth reduced model for AHTs can be used that calculates the mean AHT over the training period.

In some groups within call centers, agents (SRs) can carry up to 15 different skills which means they are asked to answer 15 different types of inbound calls. Moreover, certain types of calls are load-balanced across multiple call centers with various types of routers (e.g. CISCO, AVAYA) that can integrate caller attributes for precision-routing. The initial application of the proposed methodology supports an Agent Based/Discrete Event simulation model of each business unit's call center operations. An accurate short-term forecasting tool for call volumes and average handling times is the most important component for the daily simulation and optimization efforts. Five key performance parameters for call centers are tracked and updated with a penalty summation function optimization routine to improve load balancing parameters and best match routing wait times.

The weighted absolute percentage error was used to compare the accuracy of various models on holdout (validation) data. This metric weights the error rates for each period of the day by the number of calls received during that period. Models can also be compared against a linear fixed effects benchmark which includes no random effects or correlated residuals.

While likelihood ratio tests on the data conclude that the two AR(1) correlation parameters (one in each of G and R) are useful additions to the models, these tests only consider the training data used to build the models. Comparing the performance across validation data that is not used in constructing the model gives a better sense of how the models may perform once deployed. To compare the predictive ability of the doubly stochastic model with that of the fixed effects regression model, both models were fit to 15 splits across two datasets. Each dataset includes a different four-week period of training data and a one-week forecast period for the validation data.

Figure 10:
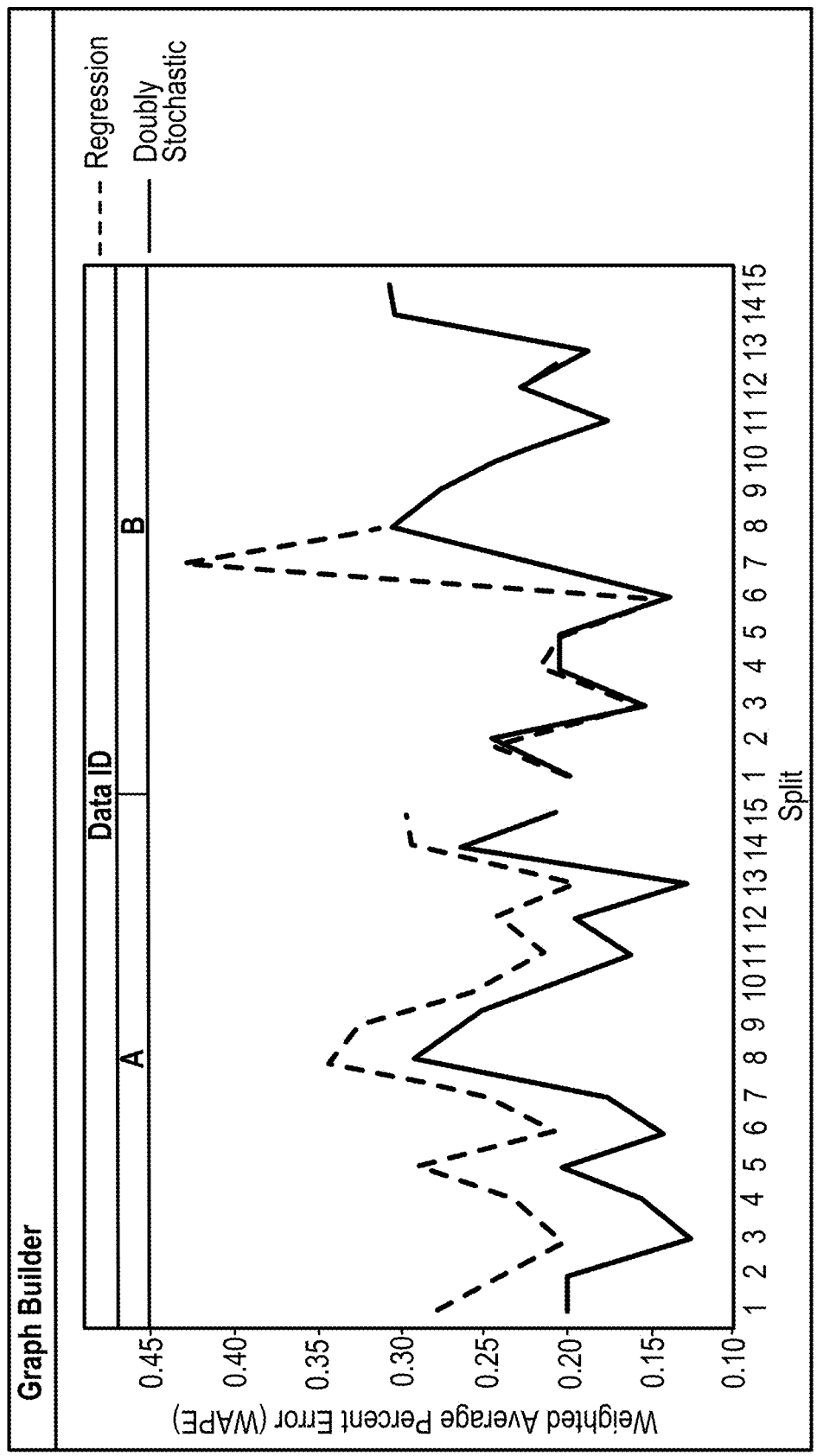

Weighted Average Percent Error (WAPE) performance differs across the two datasets, as shown in the example of FIG. 10, which shows the WAPE based on validation data across 15 splits and 2 data sets. In Dataset A, the doubly stochastic model outperforms the regression model in every split. In Dataset B, the regression model matches the performance of the doubly stochastic model in all but two of the splits. This difference across the datasets could be due to changes in the behavior of the call arrival process.

Split 7 of Dataset B records a large improvement in WAPE for the doubly stochastic model over the regression model, as shown in FIG. 10. The data suggests an explanation: there is a clear increase in the overall number of calls received in the fourth and final week of the training data, and that increase was sustained during the forecasting (validation) period. The day-to-day correlations of the doubly stochastic model lead to an increase in the forecasted call counts due to the uptick at the end of the training period. By contrast, the regression model assumes stable behavior within periods of given weekdays across the dataset.

The improved doubly stochastic model described herein is applicable to quality processes with complex cyclical behavior proposed for call center volumes. Implementations extend and improve on previously available solutions to jointly estimate fixed and random effects leading to potential increased model precision. Implementations can also employ an automated sequential approach to fit the appropriate level of dependency structure for both call volumes and handling times. Moreover, implementations include holidays (or other process disturbance), tuning convergence criterion and improving estimation methodologies. A small example with 15 representative skills across a four week training period demonstrated the procedure's effectiveness over least squares for two different data sets.

Moreover, implementations tested show considerable improvements in the point estimates through the use of the doubly stochastic model over the point estimates of the regression model, and may also provide benefits of improved prediction intervals. Previous work has noted remarkable improvement in the coverage probabilities of the doubly stochastic prediction intervals. Implementations using the doubly stochastic forecasts also provide improvements over standard Box-Jenkins Autoregressive Integrated Moving Average (ARIMA), seasonal smoothing, and Unobservable Components Models (UCM) for the majority of the splits across the enterprise.

Figure 11:
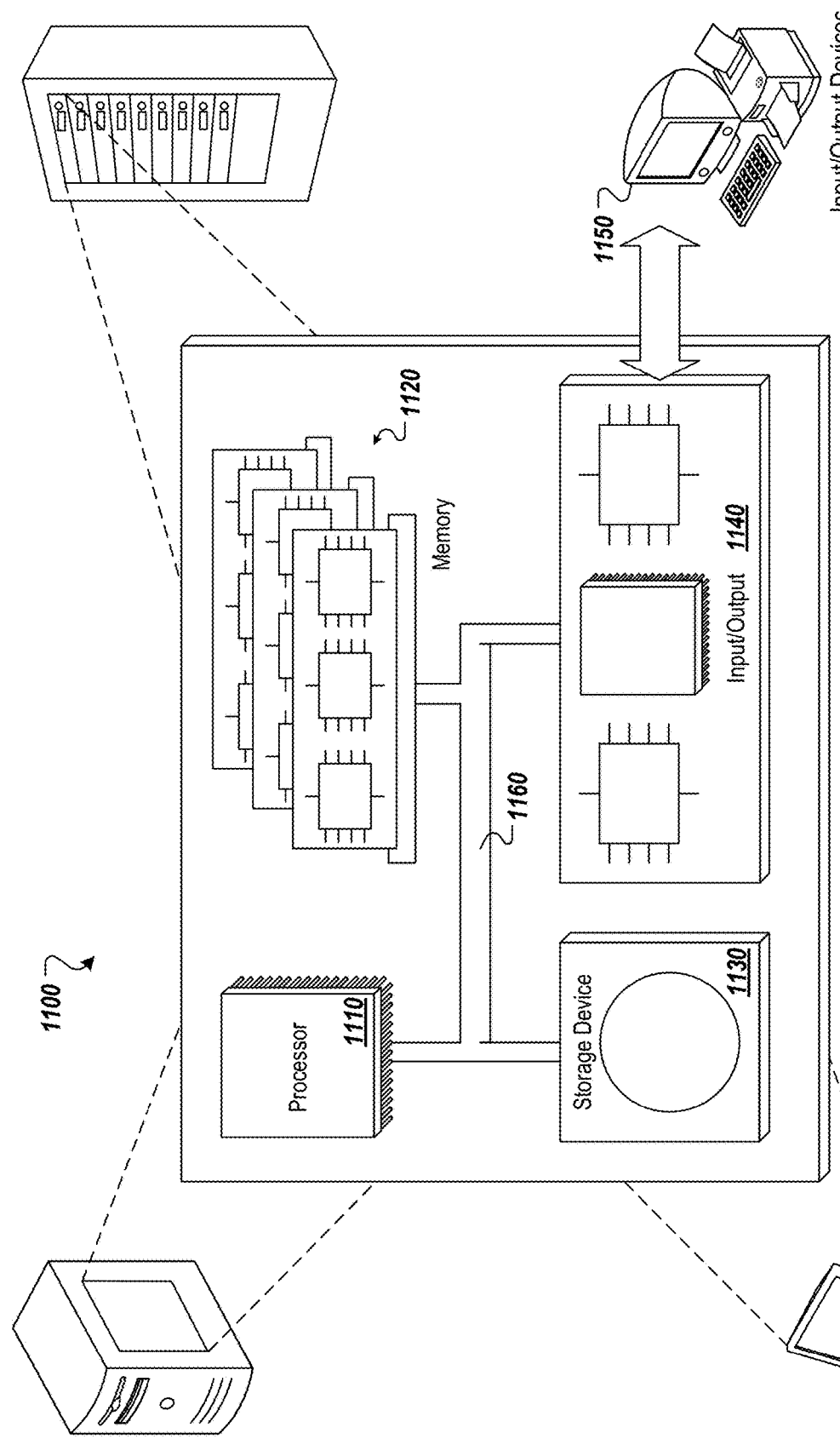
FIG. 11 depicts an example computing system, according to implementations of the present disclosure.

FIG. 11 depicts an example computing system 1100, according to implementations of the present disclosure. The system 1100 may be used for any of the operations described with respect to the various implementations discussed herein. For example, the system 1100 may be included, at least in part, in one or more of the user device 104, the SR device 120, the service management device(s) 108, and/or other computing device(s) described herein. The system 1100 may include one or more processors 1110, a memory 1120, one or more storage devices 1130, and one or more input/output (I/O) devices 1150 controllable through one or more I/O interfaces 1140. The various components 1110, 1120, 1130, 1140, or 1150 may be interconnected through at least one system bus 1160, which may enable the transfer of data between the various modules and components of the system 1100.

The processor(s) 1110 may be configured to process instructions for execution within the system 1100. The processor(s) 1110 may include single-threaded processor(s), multi-threaded processor(s), or both. The processor(s) 1110 may be configured to process instructions stored in the memory 1120 or on the storage device(s) 1130. The processor(s) 1110 may include hardware-based processor(s) each including one or more cores. The processor(s) 1110 may include general purpose processor(s), special purpose processor(s), or both.

The memory 1120 may store information within the system 1100. In some implementations, the memory 1120 includes one or more computer-readable media. The memory 1120 may include any number of volatile memory units, any number of non-volatile memory units, or both volatile and non-volatile memory units. The memory 1120 may include read-only memory, random access memory, or both. In some examples, the memory 1120 may be employed as active or physical memory by one or more executing software modules.

The storage device(s) 1130 may be configured to provide (e.g., persistent) mass storage for the system 1100. In some implementations, the storage device(s) 1130 may include one or more computer-readable media. For example, the storage device(s) 1130 may include a floppy disk device, a hard disk device, an optical disk device, or a tape device. The storage device(s) 1130 may include read-only memory, random access memory, or both. The storage device(s) 1130 may include one or more of an internal hard drive, an external hard drive, or a removable drive.

One or both of the memory 1120 or the storage device(s) 1130 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1100. In some implementations, the CRSM may include a data store that provides storage of computer-readable instructions or other information in a non-transitory format. The CRSM may be incorporated into the system 1100 or may be external with respect to the system 1100. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1110 and the memory 1120 may be supplemented by, or incorporated into, one or more application-specific integrated circuits (ASICs).

The system 1100 may include one or more I/O devices 1150. The I/O device(s) 1150 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1150 may also include one or more output devices such as a display, LED(s), an audio output device (e.g., a speaker), a printer, a haptic output device, and so forth. The I/O device(s) 1150 may be physically incorporated in one or more computing devices of the system 1100, or may be external with respect to one or more computing devices of the system 1100.

The system 1100 may include one or more I/O interfaces 1140 to enable components or modules of the system 1100 to control, interface with, or otherwise communicate with the I/O device(s) 1150. The I/O interface(s) 1140 may enable information to be transferred in or out of the system 1100, or between components of the system 1100, through serial communication, parallel communication, or other types of communication. For example, the I/O interface(s) 1140 may comply with a version of the RS-232 standard for serial ports, or with a version of the IEEE 1284 standard for parallel ports. As another example, the I/O interface(s) 1140 may be configured to provide a connection over Universal Serial Bus (USB) or Ethernet. In some examples, the I/O interface(s) 1140 may be configured to provide a serial connection that is compliant with a version of the IEEE 1394 standard.

The I/O interface(s) 1140 may also include one or more network interfaces that enable communications between computing devices in the system 1100, or between the system 1100 and other network-connected computing systems. The network interface(s) may include one or more network interface controllers (NICs) or other types of transceiver devices configured to send and receive communications over one or more networks using any network protocol.

Computing devices of the system 1100 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1100 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method for routing calls in a service environment, the method performed by at least one processor, the method comprising:
   receiving, by the at least one processor, first call volume information that describes call volume in the service environment during a first period of time;
   providing, by the at least one processor, the first call volume information as input to a doubly stochastic forecasting model, wherein the doubly stochastic forecasting model simultaneously models the call volume on multiple different time scales, wherein the doubly stochastic forecasting model generates a predicted call volume by determining an arrival rate parameter of one time scale based on residuals from expected values on another time scale;
   determining, by the at least one processor, that an output of the doubly stochastic forecasting model does not converge;
   in response to determining that an output of the doubly stochastic forecasting model does not converge, attempting, by the at least one processor, to predict second call volume information that includes predicted call volume during a second period of time using a reduced model; and
   dynamically routing, by the at least one processor, at least one call that is received in the service environment based on the predicted call volume.

2. The method of claim 1, wherein determining that the output of the doubly stochastic forecasting model does not converge by determining that the output has not converged after executing the doubly stochastic forecasting model for a predetermined number of times.

3. The method of claim 1, further comprising training the doubly stochastic forecasting model using training data that includes call volume information corresponding to the multiple different time scales.

4. The method of claim 1, wherein:
the first call volume information further describes call wait times and call handling times in the service environment during the first period of time; and
the second call volume information further includes predicted call wait times and predicted call handling times during the second period of time.

5. The method of claim 1, wherein the predicted call volume is further based on at least one exogenous variable.

6. The method of claim 1, wherein the reduced model uses a first time scale model that is based on a first time scale of the multiple different time scales.

7. The method of claim 6, wherein the multiple different time scales include an intra-day time scale and an inter-day time scale.

8. The method of claim 7, further comprising based on determining that the output of the first time scale model does not converge, attempting, by the at least one processor, to predict the call volume during the second period of time using a second time scale model that is based on a second time scale of the multiple different time scales.

9. The method of claim 8, wherein:
the first time scale is an intra-day time scale; and
the second time scale is an inter-day time scale.

10. The method of claim 8, further comprising based on determining that the output of the second time scale model does not converge, attempting, by the at least one processor, to predict the call volume during the second period of time based on an overall average call volume.

11. The method of claim 1, wherein the reduced model allows for inter-day correlation but not intra-day correlation and fits $Y=X\beta+Zb+\varepsilon$, with $\varepsilon\sim N(0,\sigma^2 I)$, where Y is a vector of transformed call counts, X is a matrix containing levels of fixed effects for each observation, $\beta$ is a vector of fixed effects parameters containing a day-of-week×period-of day interaction and a p_group×holiday-indicator interaction, Z is a binary coefficient matrix for random day-to-day effects in the model, where b is a vector of random day-to-day effects, where I is an identity matrix with dimension equal to a number of observations.

12. A system comprising:
at least one processor; and
memory storing instructions which, when executed, instruct the at least one processor to perform operations comprising:
receiving first call volume information that describes call volume in a service environment during a first period of time;
providing the first call volume information as input to a doubly stochastic forecasting model, wherein the doubly stochastic forecasting model simultaneously models the call volume on multiple different time scales, wherein the doubly stochastic forecasting model generates a predicted call volume by determining an arrival rate parameter of one time scale based on residuals from expected values on another time scale;
determining that an output of the doubly stochastic forecasting model does not converge;
in response to determining that an output of the doubly stochastic forecasting model does not converge, attempting to predict second call volume information that includes predicted call volume during a second period of time using a reduced model; and
dynamically routing at least one call that is received in the service environment based on the predicted call volume.

13. The system of claim 12, wherein determining that the output of the doubly stochastic forecasting model does not converge by determining that the output has not converged after executing the doubly stochastic forecasting model for a predetermined number of times.

14. The system of claim 12, the operations further comprising training the doubly stochastic forecasting model using training data that includes call volume information corresponding to the multiple different time scales.

15. The system of claim 12, wherein:
the first call volume information further describes call wait times and call handling times in the service environment during the first period of time; and
the second call volume information further includes predicted call wait times and predicted call handling times during the second period of time.

16. The system of claim 12, wherein the predicted call volume is further based on at least one exogenous variable.

17. The system of claim 12, wherein the reduced model uses a first time scale model that is based on a first time scale of multiple different time scales.

18. The system of claim 17, wherein the multiple different time scales include an intra-day time scale and an inter-day time scale.

19. The system of claim 18, the operations further comprising based on determining that the output of the first time scale model does not converge, attempting, by the at least one processor, to predict the call volume during the second period of time using a second time scale model that is based on a second time scale of the multiple different time scales, wherein:
the first time scale is an intra-day time scale; and
the second time scale is an inter-day time scale.

20. One or more non-transitory computer-readable storage media storing instructions which, when executed, instruct at least one processor to perform operations comprising:
receiving first call volume information that describes call volume in a service environment during a first period of time;
providing the first call volume information as input to a doubly stochastic forecasting model, wherein the doubly stochastic forecasting model simultaneously models the call volume on multiple different time scales, wherein the doubly stochastic forecasting model generates a predicted call volume by determining an arrival rate parameter of one time scale based on residuals from expected values on another time scale;
determining that an output of the doubly stochastic forecasting model does not converge;
in response to determining that an output of the doubly stochastic forecasting model does not converge, attempting to predict second call volume information that includes predicted call volume during a second period of time using a reduced model; and dynamically routing at least one call that is received in the service environment based on the predicted call volume.

\* \* \* \* \*